(12) United States Patent
Theverapperuma et al.

(10) Patent No.: US 9,516,159 B2
(45) Date of Patent: Dec. 6, 2016

(54) SYSTEM AND METHOD OF DOUBLE TALK DETECTION WITH ACOUSTIC ECHO AND NOISE CONTROL

(71) Applicant: Apple Inc., Cupertino, CA (US)

(72) Inventors: Lalin S. Theverapperuma, Cupertino, CA (US); Vasu Iyengar, Pleasanton, CA (US); Sean A. Ramprashad, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/880,824

(22) Filed: Oct. 12, 2015

(65) Prior Publication Data

US 2016/0127535 A1 May 5, 2016

Related U.S. Application Data (60) Provisional application No. 62/074,867, filed on Nov. 4, 2014.

(51) Int. Cl.
*H04B 1/38* (2015.01)
*H04M 3/00* (2006.01)
(Continued)

(52) U.S. Cl.
CPC .......... *H04M 3/002* (2013.01); *G10L 21/0205* (2013.01); *G10L 21/0208* (2013.01);
(Continued)

(58) Field of Classification Search
CPC ......... H04M 9/082; H04M 3/002; H04B 3/20; G10L 21/02; G10L 21/0205; G10L 21/0208; G10L 21/0264; G10L 2021/02082; G10L 2021/02165
(Continued)

(56) References Cited

U.S. PATENT DOCUMENTS

| | | | |
|---|---|---|---|
| 5,960,077 A * | 9/1999 | Ishii | H04B 3/23 379/406.08 |
| 7,359,504 B1 * | 4/2008 | Reuss | H04M 9/082 379/406.01 |

(Continued)

OTHER PUBLICATIONS

Ephraim, Yariv et al., "Speech Enhancement Using a Minimum Mean-Square Error Short-Time Spectral Amplitude Estimator", IEEE Trans. on Acoustics, Speech, and Signal Processing, vol. ASSP-32, No. 6, Dec. 1984 (pp. 1109-1121).
(Continued)

*Primary Examiner* — Duc M Nguyen
(74) *Attorney, Agent, or Firm* — Blakely, Sokoloff, Taylor & Zafman LLP (57) ABSTRACT

System of improving sound quality includes loudspeaker, microphone, accelerometer, acoustic-echo-cancellers (AEC), and double-talk detector (DTD). Loudspeaker outputs loudspeaker signal including downlink audio signal from far-end speaker. Microphone generates microphone uplink signal and receives at least one of: near-end speaker, ambient noise, and loudspeaker signals. Accelerometer generates accelerometer-uplink signal and receives at least one of: near-end speaker, ambient noise, and loudspeaker signals. First AEC receives downlink audio, microphone-uplink and double talk control signals, and generates AEC-microphone linear echo estimate and corrected AEC-microphone uplink signal. Second AEC receives downlink audio, accelerometer uplink and double talk control signals, and generates AEC-accelerometer linear echo estimate and corrected AEC-accelerometer uplink signal. DTD receives downlink audio signal, uplink signals, corrected uplink signals, linear echo estimates, and generates double-talk control signal. Uplink audio signal including at least one of corrected microphone-uplink signal and corrected accelerometer-uplink signal is generated. Other embodiments are described.

21 Claims, 5 Drawing Sheets

(51) Int. Cl.
*G10L 21/0208* (2013.01)
*G10L 21/02* (2013.01)
*H04M 1/60* (2006.01)
*H04L 5/14* (2006.01)
*H04M 9/08* (2006.01)
*G10L 21/0264* (2013.01)
*G10L 21/0216* (2013.01)

(52) U.S. Cl.
CPC ............ *H04L 5/14* (2013.01); *H04M 1/6041* (2013.01); *H04M 9/082* (2013.01); *G10L 21/0264* (2013.01); *G10L 2021/02082* (2013.01); *G10L 2021/02161* (2013.01); *G10L 2021/02165* (2013.01); *H04M 1/60* (2013.01)

(58) Field of Classification Search
USPC ...................................... 455/570; 379/406.01
See application file for complete search history.

(56) References Cited

U.S. PATENT DOCUMENTS

| | | | | |
|---|---|---|---|---|
| 8,175,871 | B2 * | 5/2012 | Wang | H04M 9/082 379/406.01 |
| 8,271,051 | B2 | 9/2012 | Wang | |
| 8,498,423 | B2 * | 7/2013 | Thaden | G10L 21/02 370/289 |
| 8,855,329 | B2 * | 10/2014 | Slapak | F24F 13/24 181/201 |
| 8,954,324 | B2 * | 2/2015 | Wang | G10L 25/78 704/215 |
| 2007/0121926 | A1 | 5/2007 | Gall et al. | |
| 2007/0258579 | A1 * | 11/2007 | Hirai | H04M 9/082 379/406.08 |
| 2010/0135483 | A1 * | 6/2010 | Mohammad | H04M 9/082 379/406.08 |
| 2013/0129101 | A1 * | 5/2013 | Tashev | H04M 9/082 381/66 |
| 2013/0332156 | A1 * | 12/2013 | Tackin | H04M 1/6041 704/226 |
| 2014/0146963 | A1 | 5/2014 | Ikram | |
| 2014/0205105 | A1 | 7/2014 | Cleve et al. | |
| 2014/0328490 | A1 * | 11/2014 | Mohammad | H04M 9/082 381/66 |

OTHER PUBLICATIONS

Benesty, Jacob et al., "A New Class of Doubletalk Detectors Based on Cross-Correlation", IEEE Trans. on Speech and Audio Processing, vol. 8, No. 2, Mar. 2000 (pp. 168-172).

Schroeder, M.R. et al., "Optimizing Digital Speech Coders by Exploiting Masking Properties of the Human Ear", J. Acoust. Soc. Am., vol. 66, No. 6, Dec. 1979 (pp. 1647-1652).

Gustaffson, Stefan et al., "A Psychoacoustic Approach to Combined Acoustic Cancellation and Noise Reduction", IEEE Trans. on Speech and Audio Processing, vol. 20, No. 5, Jul. 2002 (pp. 245-256).

Johnston, James D., "Transform Coding of Audio Signals Using Perceptual Noise Criteria", IEEE J. on Selected Areas in Communications, vol. 6, No. 2, Feb. 1988 (pp. 314-323).

Hoshuyama, Osamu et al., "An Acoustic Echo Suppressor Based on Frequency-Domain Model of Highly Nonlinear Residual Echo", Media and Information Research Laboratories, NEC Corporation, JP, ICASSP 2006 (pp. 269-272).

Enzner, Gerald et al., "Unbiased Residual Echo Power Estimation for Hands-Free Telephony", Institute of Communication System and Data Processing, Aachen Univ. of Tech., D-52056 Aachen, Germany, IEEE 2002 (pp. 1893-1896).

* cited by examiner

SYSTEM AND METHOD OF DOUBLE TALK DETECTION WITH ACOUSTIC ECHO AND NOISE CONTROL

CROSS-REFERENCE TO RELATED APPLICATIONS

This application claims the benefit pursuant to 35 U.S.C. 119(e) of U.S. Provisional Application No. 62/074,867, filed Nov. 4, 2014, which application is specifically incorporated herein, in its entirety, by reference.

FIELD

An embodiment of the invention relate generally to a system and method of double talk detection and acoustic echo and noise control.

BACKGROUND

Currently, a number of consumer electronic devices are adapted to receive speech from a near-end talker (or environment) via microphone ports, transmit this signal to a far-end device, and concurrently output audio signals, including a far-end talker, that are received from a far-end device. While the typical example is a portable telecommunications device (mobile telephone), with the advent of Voice over IP (VoIP), desktop computers, laptop computers and tablet computers may also be used to perform voice communications.

In these full-duplex communication devices, where both parties can communicate to the other simultaneously, the downlink signal that is output from the loudspeaker may be captured/acquired by the microphone and get fed back to the far-end device as echo. This is due to the natural coupling between the microphone and loudspeaker, e.g. the coupling is inherent due to the proximity of the microphones to the loudspeakers in these devices, the use of loud playback levels in the loudspeaker, and the sensitive microphones in these devices. This echo, which can occur concurrently with the desired near-end speech, often renders the user's speech difficult to understand, and even unintelligible is such feedback loops though multiple near-end/far-end playback and acquisition cycles. Echo, thus, degrades the quality of the voice communication.

SUMMARY

Generally, the invention relates to improving the sound quality of an electronic device using a system and method of double-talk detection and near-end noise and speech differentiation. The approach improves acoustic echo control, e.g. improves both linear echo cancelation and non-linear echo suppression, and improves noise suppression. In full-duplex communication devices, the downlink signal that is output from the loudspeaker may be captured by the microphone and get fed back to the far-end speaker as echo, echo which is included in the uplink signal. In order to remove the unwanted echo of the far-end signal from the near-end microphone signal, both linear Acoustic Echo Cancellers (AECs) and non-linear Echo Suppressors (ESs) may be used. A critical aspect of both such approaches is a robust and accurate double talk detector. In addition, at the near-end device Noise Suppressors (NSs) may be used to improve the characteristics of near-end speech over near-end noise.

AECs may be adaptive filters that linearly estimate echo to generate linear echo estimates and to generate a corrected signal using the linear echo estimates. For instance, the AEC may receive a downlink signal and a microphone uplink signal, the AEC generates the linear echo estimate which is then subtracted (linearly) from the microphone uplink signal to generate a corrected microphone signal. The corrected microphone signal now has less echo than the original microphone signal. ESs may either filter or non-linearly suppression the microphone signal in various frequency bands. Doing so can also reduce the relative strength of undesired echo to desired near-end signal in the processed signal. However, critical to both approaches is the need to detect that there is presence of near-end speech even when it is concurrent with undesired echo. This detection of near-end speech can be both globally across frequency for a given time instance, or even locally within various bands for a given time instance. If the system is not able to, with sufficiently low misdetection or sufficiently low false-alarm do this detection of near-end speech, the echo control in the system can be impaired. Similarly, if a NS cannot differentiate echo from near-end speech or near-end noise, the operation of the NS can be impaired.

For example, if filters in an AEC adapt in time or frequency instances where there is concurrent, presence of near-end speech and echo the filter can diverge. Similarly, if the system indicates that there is near-end present even when there is not, the AEC may not adapt its filters as quickly, and may even freeze such adaptation, impairing the AEC. Similarly, in an ES or a NS misclassification of the presence of near-end, or the type or near-end, may lead an ES or NS to suppress too much or too little.

The presence of echo can largely be determined by activity of the downlink signal driving the loudspeaker, with additional nominal information on the coupling strength and propagation delay between loudspeaker and microphone. The real challenge is the detection of near-end speech in the signal when there is also echo present. Thus, the double talk detector, which detects when there is presence of double talk (i.e., when both the near-end and far-end talkers are active at the same time such that the uplink audio signals include both near-end speech and far-end speech), is needed to help control the AECs, ESs, and NSs, accordingly.

In one embodiment, a system of double-talk detection and acoustic echo cancellation improves the sound quality of an electronic device (e.g., a mobile device). The system includes a loudspeaker, a microphone, an accelerometer, a first AEC, a second AEC, and a double-talk detector. The double-talk detector may be a single double-talk detector, or it may be a plurality of double-talk detectors. For example, each AEC may have its own double-talk detector. Additionally, there may be a third double-talk detector that incorporates the separate DTDs for each AEC.

The loudspeaker outputs a receiver signal including a downlink audio signal from a far-end talker. The microphone receives at least one of: a near-end talker signal, ambient near-end noise signal, and the loudspeaker signal. The microphone generates a microphone uplink signal. The accelerometer receives at least one of: the near-end talker signal, the ambient near-end noise signal, and the loudspeaker signal. The accelerometer generates an accelerometer uplink signal. In one embodiment, the loudspeaker outputs a received downlink audio signal from a far-end talker. The microphone signal includes at least one of: a near-end talker signal, ambient near-end noise signal, and part of the loudspeaker signal. This microphone signal is part of the uplink signal. The accelerometer signal includes at least one of: the near-end talker signal, the ambient near-end noise signal, and part of the loudspeaker signal.

This accelerometer signal gets combined with the microphone signal at the processing to generate a systems uplink signal.

The first AEC receives the downlink audio signal, the microphone uplink signal, and a double-talk control signal, and generates linear estimate of the echo (AEC-mic linear echo estimate) and also generates a corrected AEC-mic uplink signal by subtracting the AEC-mic linear echo estimate from the microphone uplink signal. Accordingly, the corrected AEC-mic uplink signal is a microphone uplink signal where some of the echo is linearly removed.

The second AEC receives the downlink audio signal, the accelerometer uplink signal, and the double-talk control signal, and generates a linear estimate of the echo (AEC-accelerometer linear echo estimate) and also generates a corrected AEC-accelerometer uplink signal by subtracting the AEC-accelerometer linear echo estimate from the accelerometer uplink signal. Accordingly, the corrected AEC-accelerometer uplink signal is an accelerometer signal where some of the echo on the accelerometer is linearly removed. Thus, in embodiments of the invention, the accelerometer includes an echo control algorithm operating on the accelerometer signal itself. This algorithm generates statistics that would not be present in a system that did not run a second AEC on the accelerometer.

By comparing statistics from the AEC on the microphone (first AEC) to the AEC of the accelerometer (second AEC), where such statistics may themselves be a comparison of statistics between statistics of a given AEC, for example a comparison of the relative level or spectrum of the linear echo estimate to the AEC input, extra information can be obtained to improve double-talk indicators.

Accordingly, in embodiments of the invention, the output of the first and second AECs which are outputs that have near-end speech and some near-end noise, can be compared now that echo levels are reduced. Such outputs can be used to make measurements on the relative strength of near-end speech to near-end noise. In particular, the ratio of near-end noise energy to near-end speech energy is generally smaller on an accelerometer than on a microphone. Near-end noise to near-end speech distinction can therefore be made by comparing such ratios, i.e. a ratio estimated on an accelerometer signal to one estimated on a microphone, post the AECs, in time and or frequency.

Furthermore, the general smaller relative pick up of near-end noise on an accelerometer makes the AEC on the accelerometer generally more robust to DTD issues involving near-end noise when near-end noise is the primary near-end signal.

By comparing statistics from the AEC on the microphone to the AEC of the accelerometer, where such statistics may themselves be a comparison of statistics between statistics of a given AEC, for example, a comparison of the relative level or spectrum of the linear echo estimate to the AEC input, extra information can be obtained to improve classification of near-end characteristics such as the near-end speech level as compared to the near-end noise level on a microphone.

In one embodiment, a system of double-talk detection and acoustic echo cancellation includes a loudspeaker, a microphone, an accelerometer, a first acoustic echo canceller (AEC), a second AEC, a signal corrector, and a double-talk detector. The double-talk detector may be a single double-talk detector, or it may be a plurality of double-talk detectors. For example, each AEC may be coupled to or include a double-talk detector, respectively. Additionally, there may be a third double-talk detector. The signal corrector may include elements that further correct the signal such as Noise Suppressors (NSs) and non-linear Echo Suppressors (ESs). The NSs may further include one NS operating on the microphone uplink signal, and another NS operating on the accelerometer uplink signal. In some embodiments, the signal corrector further includes a signal blender.

The loudspeaker outputs a receiver signal including a downlink audio signal from a far-end talker. The microphone receives at least one of: a near-end talker signal, ambient near-end noise signal, and the loudspeaker signal. The microphone generates a microphone uplink signal. The accelerometer receives at least one of: the near-end speaker talker signal, the ambient near-end noise signal, and the loudspeaker signal. The accelerometer generates an accelerometer uplink signal.

Each double-talk detector DTD receives the downlink audio signal. Additionally, a global DTD or a DTD embedded in the AEC on the microphone signal uses the microphone uplink signal and the linear echo estimate of the microphone AEC ("AEC-mic linear echo estimate"). Additionally, a global DTD or a DTD embedded in the AEC on the accelerometer signal uses the accelerometer uplink signal and the linear echo estimate of the accelerometer AEC (i.e., AEC-accelerometer linear echo estimate). More generally, in some embodiments, any DTD may receive and use all these signals. In these embodiments, individual AECs may run in different orders with respect to each other, providing either current information or past information on the signals to each other.

A double-talk detector generates a double-talk control signal that indicates to the first and/or second AECs the presence of a double-talk situation or the relative strength of near-end to echo.

A double-talk detector may also generate control signals that indicate to the first and/or second AECs or to other components such as the signal corrector which includes NSs, ESs, and the signal blender, the presence of a double-talk situation, the relative strength of near-end to echo, and the relative strength of near-end noise to either near-end speech and/or echo.

An AEC may be directed to change the convergence speed of its algorithm, or to maintain previous adaptive filter estimates and not to adapt, by using such statistics. An ES included in the signal corrector may be directed to update a residual echo estimate statistic, such as leakage, or update a noise-floor estimate, or to maintain previous such, by using such statistics. A NS included in the signal corrector may be directed to update a residual echo estimate statistic, such as leakage, or update a noise-floor estimate, or to maintain previous such, by using such statistics.

In another embodiment, a method of double-talk detection and acoustic echo cancellation starts with a processor of a double-talk detector receiving a downlink audio signal which is to be played over the loudspeaker, a microphone uplink signal from a microphone, an accelerometer uplink signal from an accelerometer, a linearly echo reduced microphone uplink signal from a first AEC ("a corrected AEC-mic uplink signal"), a linear echo reduced accelerometer uplink signal from a second AEC ("a corrected AEC-accelerometer uplink signal"), an estimate of the linear echo from a first AEC ("AEC-mic linear echo estimate"), and an estimate of the linear echo from a second AEC (AEC-accelerometer linear echo estimate"). The processor of the double-talk detector then generates current double-talk and noise-level control signals based on the downlink audio signal, the microphone uplink signal, the accelerometer uplink signal, the AEC-mic output signal, the AEC-accelerometer output signal, the AEC-mic linear echo estimate, the AEC-accelerometer linear echo estimate, noise-estimation levels, and past double-talk and noise-level control signals. The processor then transmits the double-talk and noise-level control signal to the first and second AECs, and possibly also to NSs, ESs, and signal blenders included in the signal corrector. The double-talk and noise-level control signal can be used to direct any of these modules to update parameters, or freeze parameters, or with what speed to update parameters, such as adaptive filters and echo and noise estimates.

The above summary does not include an exhaustive list of all aspects of the present invention. It is contemplated that the invention includes all systems, apparatuses and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Figure 1:
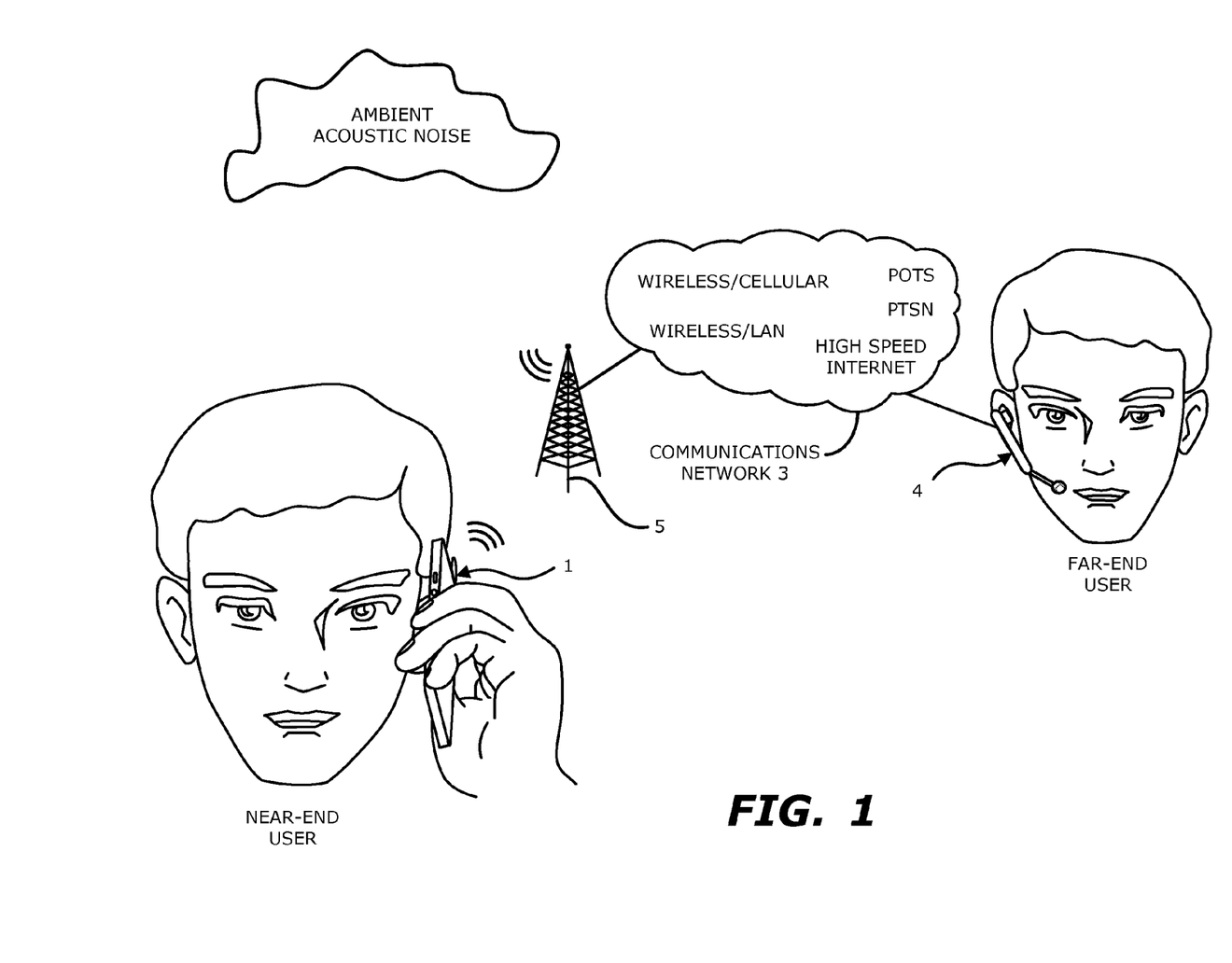
FIG. 1 depicts near-end user and a far-end user using an exemplary electronic device in which an embodiment of the invention may be implemented.

FIG. 1 depicts near-end user using exemplary electronic devices in which an embodiment of the invention may be implemented. The electronic device 10 may be a mobile communications handset device such as a smart phone or a multi-function cellular phone. The sound quality improvement techniques using double talk detection and acoustic echo cancellation described herein can be implemented in such a user audio device, to improve the quality of the near-end audio signal. In the embodiment in FIG. 1, the near-end user is in the process of a call with a far-end user who is using another communications device 4. The term "call" is used here generically to refer to any two-way real-time or live audio communications session with a far-end user (including a video call which allows simultaneous audio). The electronic device 10 communicates with a wireless base station 5 in the initial segment of its communication link. The call, however, may be conducted through multiple segments over one or more communication networks 3, e.g. a wireless cellular network, a wireless local area network, a wide area network such as the Internet, and a public switch telephone network such as the plain old telephone system (POTS). The far-end user need not be using a mobile device, but instead may be using a landline based POTS or Internet telephony station.

Figure 2:
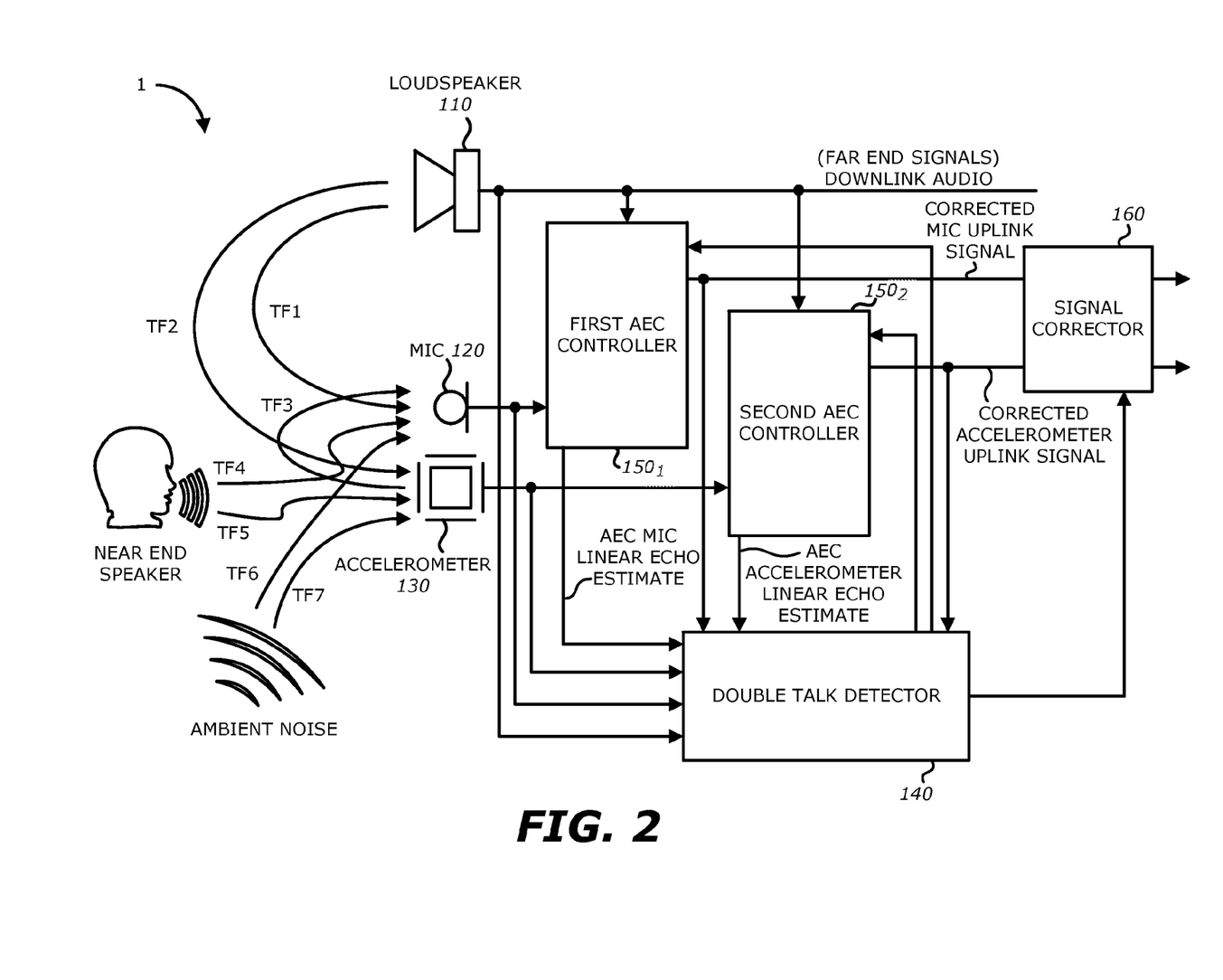
FIG. 2 illustrates a block diagram of a system of double talk detection and acoustic echo cancellation according to an embodiment of the invention.

FIG. 2 illustrates a block diagram of a system 1 of double talk detection and acoustic echo cancellation according to an embodiment of the invention. The system 1 that may be included in the electronic device 10 comprises a loudspeaker 110, a microphone 120, an accelerometer 130, a first and a second Acoustic Echo Canceller (AEC) $150_1$, $150_2$, and a double-talk detector 140. The system 1 may also comprise a signal corrector 160 that includes Noise Suppressors (NSs), Echo Suppressors (ESs) and signal blender(s).

The loudspeaker 110 is driven by an output downlink signal that includes the far-end acoustic signal components. The microphone 120 may be air interface sound pickup devices that convert sound into an electrical signal. As the near-end user is using the electronic device 10 to transmit his speech, ambient noise may also be present. Thus, the microphone 120 captures the near-end user's speech as well as the ambient noise around the electronic device 10. The downlink signal that is output from a loudspeaker 110 may also be captured by the microphone 120, and if so, the downlink signal that is output from the loudspeaker 110 could get fed back in the near-end device's uplink signal to the far-end device's downlink signal. This downlink signal would in part drive the far-end device's loudspeaker, and thus, components of this downlink signal would be included in the near-end device's uplink signal to the far-end device's downlink signal as echo. Thus, the microphone 120 may receive at least one of: a near-end talker signal, ambient near-end noise signal, and the loudspeaker signal. The microphone generates a microphone uplink signal. In one embodiment, the microphone 120 receives mainly the acoustic components of the downlink signal being output from the loudspeaker 110. While FIG. 2 illustrates a single microphone, it is understood that a plurality of microphones or a microphone array may be used. While FIG. 2 illustrates a single accelerometer, it is understood that a plurality of accelerometers may be used.

While FIG. 2 illustrates a device, it is understood that near-end and far-end devices could have similar components. As further discussed below, signals generated by the accelerometer 130 at a far-end device (e.g., a far-end accelerometer signal) may also be captured by the microphone 120 at a near-end device. Similarly, signals generated by a far-end microphone 120 may also be captured by the accelerometer 130 at a near-end device.

The accelerometer 130 may be a sensing device that measures proper acceleration in three directions, X, Y, and Z or in only one or two directions. When the user is generating voiced speech, the vibrations of the user's vocal chords are filtered by the vocal tract and cause vibrations in the bones of the user's head which are detected by the accelerometer 130. In other embodiments, an inertial sensor, a force sensor or a position, orientation and movement sensor may be used in lieu of the accelerometer 130. The accelerometer 130 generates accelerometer audio signals (e.g., accelerometer uplink signals) which may be band-limited microphone-like audio signal. For instance, in one embodiment, while the acoustic microphone 120 captures the full-band, the accelerometer 130 may be sensitive to (and capture) frequencies between 100 Hz and 2 kHz. Similar to the microphone 120, the accelerometer 130 may also capture the near-end user's speech, the ambient noise around the electronic device 10, and the downlink signal being output from the loudspeaker 110. Thus, the accelerometer 130 receives at least one of: the near-end talker signal, the ambient near-end noise signal, and the loudspeaker signal. The accelerometer generates an accelerometer uplink signal.

In one embodiment, the accelerometer 130 receives both the acoustic and the mechanical components of the downlink signal. The accelerometer uplink signals being generated by the accelerometer 130 may provide a strong output signal during the near-end user's speech while not providing a strong output signal during ambient background noise. Accordingly, the accelerometer 130 provides additional information to the information provided by the microphone 120.

To describe various embodiments we now define different signals and transfer functions mathematically. Generally such values are functions of both a time index "t" and a frequency index "f", and will be written as such. However, it should be clear that time only formulations or subband formulations are obvious to generalized, e.g. by integrating appropriately across frequency.

In the scenarios of interest we define the following sources:

$S(t, f)$: The desired speech from the person using the device $N(t, f)$: Near-end noise and other near-end signals $D(t, f)$: Downlink signal to be played over the near-end loudspeaker We also enumerate various transfer functions between these sources and the microphone of interest:

$H_S(t, f)$: The transfer function between the desired speech and the mic $H_N(t, f)$: The transfer function between the near-end noise/other near-end and the mic $H_D(t, f)$: The transfer function between the downlink signal and the mic It follows that we have the following quantities:

$V_m(t, f) = S(t, f)H_S(t, f)$: The desired speech as seen on the mic $Q_m(t, f) = N(t, f)H_N(t, f)$: The near-end noise/other near-end as seen on the mic $E_m(t, f) = D(t, f)H_D(t, f)$: The echo on the mic, i.e. downlink signal on the mic $Y_m(t, f) = V_m(t, f) + Q_m(t, f) + E_m(t, f)$ Similarly we can also enumerate various transfer functions between these sources and the accelerometer of interest:

$G_S(t, f)$: The transfer function between the desired speech and the accelerometer $G_N(t, f)$: The transfer function between the near-end noise/other near-end and the accelerometer $G_D(t, f)$: The transfer function between the downlink signal and the accelerometer $V_a(t, f) = S(t, f)G_S(t, f)$: The desired speech as seen on the accelerometer $Q_a(t, f) = N(t, f)G_N(t, f)$: The near-end noise/other near-end as seen on the accelerometer $E_a(t, f) = D(t, f)G_D(t, f)$: The echo on the accelerometer, i.e. downlink signal on the accelerometer $Y_a(t, f) = V_a(t, f) + Q_a(t, f) + E_a(t, f)$ It should be noted that all the above quantities can also be expressed as power spectrums, for example the power spectrum of $S(t,f)$ is simply $|S(t,f)|^2$.

We now describe various embodiments using the above definitions. Note, we will take advantage of various properties of the system, for example:

$\|G_S(t, f)/G_N(t, f)\|^2$ is generally larger than $\|H_S(t)f)/H_N(t, f)\|^2$ $G_D(t, f)$ may vary less over time than $H_D(t, f)$ Referring back to FIG. 2, in one embodiment, the accelerometer uplink signals from accelerometer 130 are compared to the uplink signals from the microphone 120 to assess cross-correlation between the signals in the spectral domain to reliably isolate scenarios when a microphone uplink signal or an accelerometer uplink signal includes double talk and non-double talk. In other words, the double talk and acoustic path changes are inseparable using purely microphone output signals, the accelerometer output signals provide information used to allow for double talk detection and separation (e.g., separation of the near-end microphone signal from the far-end signal during double talk). As shown in FIG. 2, the microphone 120 generates a microphone uplink signal and the accelerometer 130 generates an accelerometer uplink signal.

The first AEC $150_1$ receives the downlink audio signal, the microphone uplink signal and a double-talk control signal, generates linear estimate of the echo (AEC-mic linear echo estimate) and also generates a corrected AEC-mic uplink signal by subtracting the AEC-mic linear echo estimate from the microphone uplink signal. Accordingly, the corrected AEC-mic uplink signal is a microphone uplink signal where some of the echo is linearly removed.

The second AEC $150_2$ receives the downlink audio signal, the accelerometer uplink signal, and the double-talk control signal, and generates a linear estimate of the echo (AEC-accelerometer linear echo estimate) and also generates a corrected AEC-accelerometer uplink signal by subtracting the AEC-accelerometer linear echo estimate from the accelerometer uplink signal. Accordingly, the corrected AEC-accelerometer uplink signal is an accelerometer signal where some of the echo on the accelerometer is linearly removed. Thus, in embodiments of the invention, the accelerometer includes an echo control algorithm operating on the accelerometer signal itself. This algorithm generates statistics that would not be present in a system that did not run a second AEC on the accelerometer.

In some embodiments, the system 1 may also comprise a signal corrector 160 that includes Noise Suppressors (NSs), Echo Suppressors (ESs) and signal blender(s). The signal corrector 160 receives the corrected AEC-mic uplink signal and the corrected AEC-accelerometer uplink signal. The signal corrector 160 also receives the double-talk control signal. The NSs included in the signal corrector 160 may suppress the noise in the corrected AEC-mic uplink signal and in the corrected AEC-accelerometer uplink signal, while the ESs included in the signal corrector 160 may filter or non-linearly suppress the corrected AEC-mic uplink signal and the corrected AEC-accelerometer uplink signal in various frequency bands.

In one embodiment, an uplink audio signal is generated that includes at least one of the corrected AEC-mic uplink signal and the corrected AEC-accelerometer uplink signal. In some embodiments, the uplink audio signal may be outputted by the signal corrector 160 such that the uplink audio signal includes at least one of the corrected AEC-mic uplink signal and the corrected AEC-accelerometer uplink signal which was further processed (e.g., signal corrected by NSs, ESs, and/or signal blenders) by the signal corrector 160.

By comparing statistics from the AEC on the microphone (first AEC) to the AEC of the accelerometer (second AEC), where such statistics may themselves be a comparison of statistics between statistics of a given AEC, for example a comparison of the relative level or spectrum of the linear echo estimate to the AEC input, extra information can be obtained to improve double-talk indicators.

Accordingly, in embodiments of the invention, the output of the first and second AECs which are outputs that have near-end speech and some near-end noise, can be compared now that echo levels are reduced. Such outputs can be used to make measurements on the relative strength of near-end speech to near-end noise. In particular, the ratio of near-end noise energy to near-end speech energy is generally smaller on an accelerometer than on a microphone. Near-end noise to near-end speech distinction can therefore be made by comparing such ratios, i.e. a ratio estimated on an accelerometer signal to one estimated on a microphone, post the AECs, in time and or frequency.

Furthermore, the general smaller relative pick up of near-end noise on an accelerometer makes the AEC on the accelerometer generally more robust to DTD issues involving near-end noise when near-end noise is the primary near-end signal.

By comparing statistics from the AEC on the microphone to the AEC of the accelerometer, where such statistics may themselves be a comparison of statistics between statistics of a given AEC, for example, a comparison of the relative level or spectrum of the linear echo estimate to the AEC input, extra information can be obtained to improve classification of near-end characteristics such as the near-end speech level as compared to the near-end noise level on a microphone.

The AECs 150₁, 150₂ include adaptive filters that converge to the optimum filter coefficients in order to respectively generate the linear echo estimates for the microphone and the linear echo estimates for the accelerometer that are used to remove the echo of the downlink signal from the microphone uplink signal and the accelerometer uplink signal, respectively. In order to remove the unwanted echo of the far-end signal from the near-end microphone signal, both linear AECs 150₁, 150₂ and non-linear ESs included in the signal corrector 160 may be used. However, the presence of near-end speech during far-end speech in the uplink audio signals disrupts in the adaptation of the filters in the AEC such that, in a double talk scenario, the adaptation rate of the adaptive filters in the AEC 150₁, 150₂ need to be further modified. For instance, when double talk is detected, the adaptive filters may diverge from the optimal cancellation and may introduce echoes and artifacts related to filter divergence. Thus, in one embodiment, adaptation of the filters is prevented when double talk is detected.

For example, if filters in an AEC 150₁, 150₂ adapt in time or frequency instances where there is concurrent, presence of near-end speech and echo the filter can diverge. Similarly, if the system indicates that there is near-end present even when there is not, the AEC 150₁, 150₂ may not adapt its filters as quickly, and may even freeze such adaptation, impairing the AEC. Similarly, in an ES or a NS misclassification of the presence of near-end, or the type or near-end, may lead an ES or NS included in the signal corrector 160 to suppress too much or too little.

The presence of echo can largely be determined by activity of the downlink signal driving the loudspeaker, with additional nominal information on the coupling strength and propagation delay between loudspeaker and microphone. The real challenge is the detection of near-end speech in the signal when there is also echo present. Thus, the double talk detector 140, which detects when there is presence of double talk (i.e., when both the near-end and far-end talkers are active at the same time such that the uplink audio signals include both near-end speech and far-end speech), is needed to help control the AECs 150₁, 150₂, and the signal corrector 160 including ESs, NSs, and signal blenders, accordingly.

In one embodiment, the adaptive filters in the AECs 150₁, 150₂ are used to track the changing conditions including, for instance, (i) the mainly acoustic signals from the loudspeaker 110 that are captured by the microphone 120 (e.g., in FIG. 2, TF1: the transfer function between the loudspeaker 110 and the microphone 120), (ii) the acoustic and mechanical signals from the loudspeaker 110 that are captured by the accelerometer 130 (e.g., in FIG. 2, TF2: the transfer function between the loudspeaker 110 and the accelerometer 130), (iii) the correlation between the accelerometer uplink signals and the microphone uplink signals (e.g., in FIG. 2, TF3: the transfer function between the accelerometer 130 and the microphone 120), (iv) the near-end speaker signals captured by the microphone 120 (e.g., in FIG. 2, TF4: the transfer function between the near-end speaker and the microphone 120), and (v) the near-end speaker signals captured by the accelerometer 130 (e.g., in FIG. 2, TF5: the transfer function between the near-end speaker and the accelerometer 130).

The double talk detector 140 included in system 1 detects when there is a double talk scenario and generates a double talk control signal accordingly which is transmitted to the AECs 150₁, 150₂. The double-talk detector 140 may be a single double-talk detector as shown in FIG. 2, or the system 1 may include a plurality of double-talk detectors 140. For example, each AEC 150₁, 150₂ may be coupled to or include a double-talk detector 140, respectively. Additionally, there may be a third double-talk detector. Each of the noise estimators may be included in the system as Noise Suppressors (NSs) including one NS operating on the microphone uplink signal, and another NS operating on the accelerometer uplink signal.

Each double-talk detector (DTD) 140 receives the downlink audio signal. Additionally, a global DTD 140 or a DTD 140 embedded in the AEC 150₁ on the microphone signal uses the microphone uplink signal and the linear echo estimate of the microphone AEC ("AEC-mic linear echo estimate"). Additionally, a global DTD 140 or a DTD 140 embedded in the AEC 150₂ on the accelerometer signal uses the accelerometer uplink signal and the linear echo estimate of the accelerometer AEC (i.e., AEC-accelerometer linear echo estimate). More generally, in some embodiments, any DTD 140 may receive and use all these signals. In these embodiments, individual AECs 150₁, 150₂ may run in different orders with respect to each other, providing either current information or past information on the signals to each other.

A double-talk detector 140 generates a double-talk control signal that indicates to the first and/or second AECs 150₁, 150₂ the presence of a double-talk situation or the relative strength of near-end to echo. In the embodiment illustrated in FIG. 2, the double talk detector 140 generates the double talk control signal based on the downlink audio signal which is to be played over the loudspeaker, the microphone uplink signal, the accelerometer uplink signal, a linearly echo reduced microphone uplink signal from a first AEC 150₁ ("a corrected AEC-mic uplink signal"), a linear echo reduced accelerometer uplink signal from a second AEC 150₂ ("a corrected AEC-accelerometer uplink signal"), an estimate of the linear echo from a first AEC ("AEC-mic linear echo estimate"), and an estimate of the linear echo from a second AEC ("AEC-accelerometer linear echo estimate"). In one embodiment, the double talk control signal is a binary output, wherein '1' indicates that the double talk has been detected and '0' indicates that no double talk has been detected.

In some embodiments, the double-talk detector 140 generates current double-talk and noise-level control signals based on the downlink audio signal, the microphone uplink signal, the accelerometer uplink signal, the AEC-mic output signal, the AEC-accelerometer output signal, the AEC-mic linear echo estimate, the AEC-accelerometer linear echo estimate, noise-estimation levels, and past double-talk and noise-level control signals. The double-talk detector 140 transmits the double-talk and noise-level control signal to the first and second AECs 150₁, 150₂, and to the signal corrector 160 including NSs and ESs. The double-talk and noise-level control signal can be used to direct any of these modules to update parameters, or freeze parameters, or with what speed to update parameters, such as adaptive filters and echo and noise estimates.

In some embodiments, the double-talk detector may also generate control signals that indicate to the first and/or second AECs or to the signal corrector 160 including the NSs, ESs, and signal blender, the presence of a double-talk situation, the relative strength of near-end to echo, and the relative strength of near-end noise to either near-end speech and/or echo.

An AEC may be directed to change the convergence speed of its algorithm, or to maintain previous adaptive filter estimates and not to adapt, by using such statistics. An ES included in the signal corrector 160 may be directed to update a residual echo estimate statistic, such as leakage, or update a noise-floor estimate, or to maintain previous such, by using such statistics. A NS included in the signal corrector 160 may be directed to update a residual echo estimate statistic, such as leakage, or update a noise-floor estimate, or to maintain previous such, by using such statistics.

Figure 3:
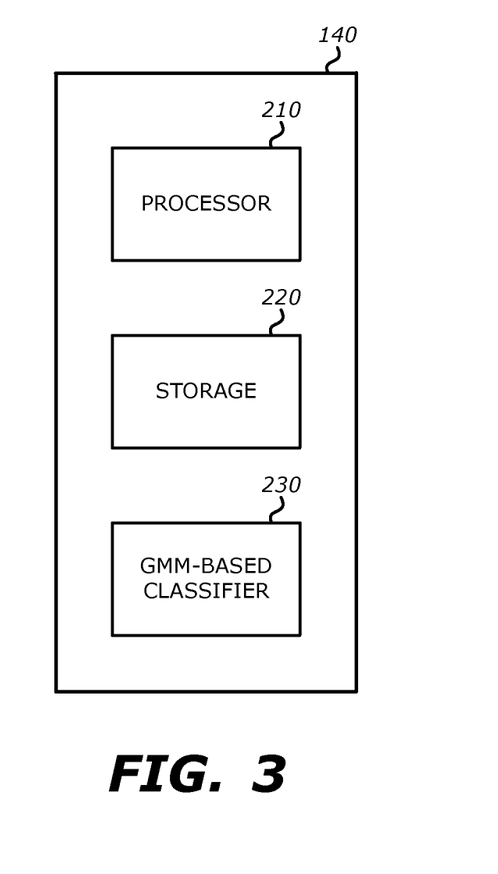
FIG. 3 illustrates the details of the double talk detector in the system of double talk detection and acoustic echo cancellation according to an embodiment of the invention.

FIG. 3 illustrates the details of the double talk detector 140 in the system 1 of double talk detection and acoustic echo cancellation according to an embodiment of the invention. The double talk detector 140 may include a processor 210, a storage device 220, and a Gaussian Mixture Model based classifier (or GMM-based classifier) 230.

The processor 210 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 210 may be used to control the operations of the double talk detector 140. For example, the processor 210 executes software that is stored in the storage device 220 to generate the double talk control signal based on the signals received. In some cases, a particular function may be implemented as two or more pieces of software that are being executed by different hardware units of a processor.

In one embodiment, three correlation measures in the spectral domain are used by the double talk detector 140 to identify the current acoustic scenario (e.g., double talk or no double talk). The first correlation measure (e.g., Cxem) is the cross-correlation between the far-end signal (e.g., downlink audio signal from the loudspeaker) and the microphone error signal. This first correlation measure is a measure of the acoustic echo coupling (or the leakage) (e.g., in FIG. 2: TF1: transfer function between the loudspeaker 110 and the microphone 120). A stronger echo path will have stronger echo coupling. Accordingly, when this echo path is changing, the first correlation measure will be reduced. During double talk, the first correlation measure is low because the near-end signal (e.g., the microphone uplink signal) would be a noise bias into the cross correlation.

In some embodiments, the first correlation measure may be:

$$C_{xe_m} = E\{e_m \cdot x^T\}$$

$$C_{xe_m} = E\{(y+v) \cdot x^T - \hat{h}_m^T \cdot x \cdot x^T\}$$

$$C_{xe_m} = (h_m^T - \hat{h}_m^T) R_{xx}$$

The second correlation measure (e.g., Cxea) is the cross-correlation between the far-end signal (e.g., downlink audio signal from the loudspeaker) and the accelerometer error signal. This second correlation measure is a measure of the coupling between the accelerometer 130 and the loudspeaker 110 (e.g., in FIG. 2: TF2: transfer function between the loudspeaker 110 and the accelerometer 130).

The third correlation measure (e.g., Cma) is the cross-correlation between the microphone 120 and the accelerometer 130 (e.g., in FIG. 2: TF3: transfer function between the microphone 120 and the accelerometer 130). During double talk (or competing speakers) and presence of ambient noise, the third correlation measure will be low. When only the near-end user speaks, some bands of the microphone uplink signal and the accelerometer uplink signal will show very high correlation in this third correlation measure. During far-end only speech, the correlation in this third correlation measure is moderate and is a function of the second correlation measure (e.g., Cxea).

As discussed above, when a near-end user is speaking, the microphone 120 and the accelerometer 130 receives the near-end speech signals. Both microphone 120 and the accelerometer 130 receive loud (or strong) signals and the double talk detector 140 may detect a high correlation between the microphone uplink signal and the accelerometer uplink signal. In one embodiment, the double talk detector 140 generates a double talk control signal that indicates that a double talk scenario is detected and that signals to the AEC 150₁, 150₂ to stop AEC divergence.

When there is a high level of near-end noise (e.g., ambient noise signal), the microphone 120 will capture the ambient noise signal but the accelerometer 130 will not capture the ambient noise signal due to the accelerometer 130's sensitivity to the limited band frequencies. Therefore, the microphone uplink signal includes the ambient noise signal whereas the accelerometer uplink signal does not include the ambient noise signal. In this scenario, the third correlation measure (e.g., Cma) and the TF3 transfer function between the microphone 120 and the accelerometer 130 will indicate that the correlations are low and the double talk detector 140 may generate a double talk control signal that indicates that a near-end noise only scenario is detected (e.g., no double talk), In this embodiment, the AEC $150_1$, $150_2$ receiving the double talk control signal that indicates no double talk do continue AEC convergence.

When the near-end user is speaking louder than the ambient noise, the double talk detector 140 will detect a high correlation between the microphone uplink signal and the accelerometer uplink signal and a high correlation between the third correlation measure (e.g., Cma) and the TF3 transfer function. Accordingly, the double talk detector 140 will detect that a double talk scenario is occurring when the near-end user is speaking louder than the ambient noise and generate a double talk control signal that signals to the AEC $150_1$, $150_2$ to stop AEC divergence and hold the adaptive filters of the AEC $150_1$, $150_2$ at their previous settings (e.g., freezing the adaptive filter coefficients).

In one embodiment, once the double talk scenario is detected, the adaptation rates of the adaptive filters of the AEC $150_1$, $150_2$ may be modified to counteract the double talk condition.

Referring back to FIG. 3, in one embodiment, the double talk detector 140 includes a GMM-based classifier 230 that is used to determine when a double talk scenario is present and when a double talk scenario is absent. The GMM classification has advantages in the high background noise and large path changes in the transfer functions (TF1-TF5 in FIG. 2) scenarios. In one embodiment, the classification by the GMM-based classifier 230 is used in addition to the classification based on the processor 210's analysis of the correlations of the received signals to further improve the determination of whether the double talk scenario is detected.

In the embodiment using the GMM-based classifier 230, the GMM training vector is generated based on artificially generated double talk conditions. For instance, the Iterative Expectations-Maximization (EM) algorithm is used to find training coefficients for the GMM-based classifier 230. In one embodiment, the feature vector includes three cross-correlation values, transfer function parameters, levels of the signals received from the microphone 120, accelerometer 130, and loudspeaker 110 (e.g., downlink signal). In one embodiment, the GMM-based classifier 230 uses an input vector that includes N variable vector (y) (where N>1). In one embodiment, the GMM-based classifier 230 outputs a signal that indicates double talk is detected (e.g. present) or double talk is not detected (e.g., absent). In some embodiments, the GMM-based classifier 230's output signal is the double talk control signal.

In one embodiment, for an N-dimensional feature vector, y, the mixture density used for the likelihood function is defined as:

$$P(y) = \frac{1}{(2\pi)^{\frac{1}{2}} |\Sigma_i|^{\frac{1}{2}}} \exp\left[-\frac{1}{2}(y-\mu_i)^T \sum_i^{-1} (y-\mu_i)\right]$$

$$p(Y | H_0) = \sum_{i=1}^{M} w_i P(y)$$

In this embodiment, the GMM-based classifier 230's output is:

$$\frac{p(Y|H0)}{p(Y|H1)} \begin{cases} > \theta \text{ accept } H0 \\ < \theta \text{ accept } H1 \end{cases}.$$

In this embodiment, in H0, the Y is from a hypothesized double talk present scenario and, in H1, the Y is not from the double talk present scenario.

In another embodiment, the classification by the GMM-based classifier 230 may also be performed with support vector machines (SVM) or classic k-Nearest Neighbors algorithm (K-NN) classifier.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
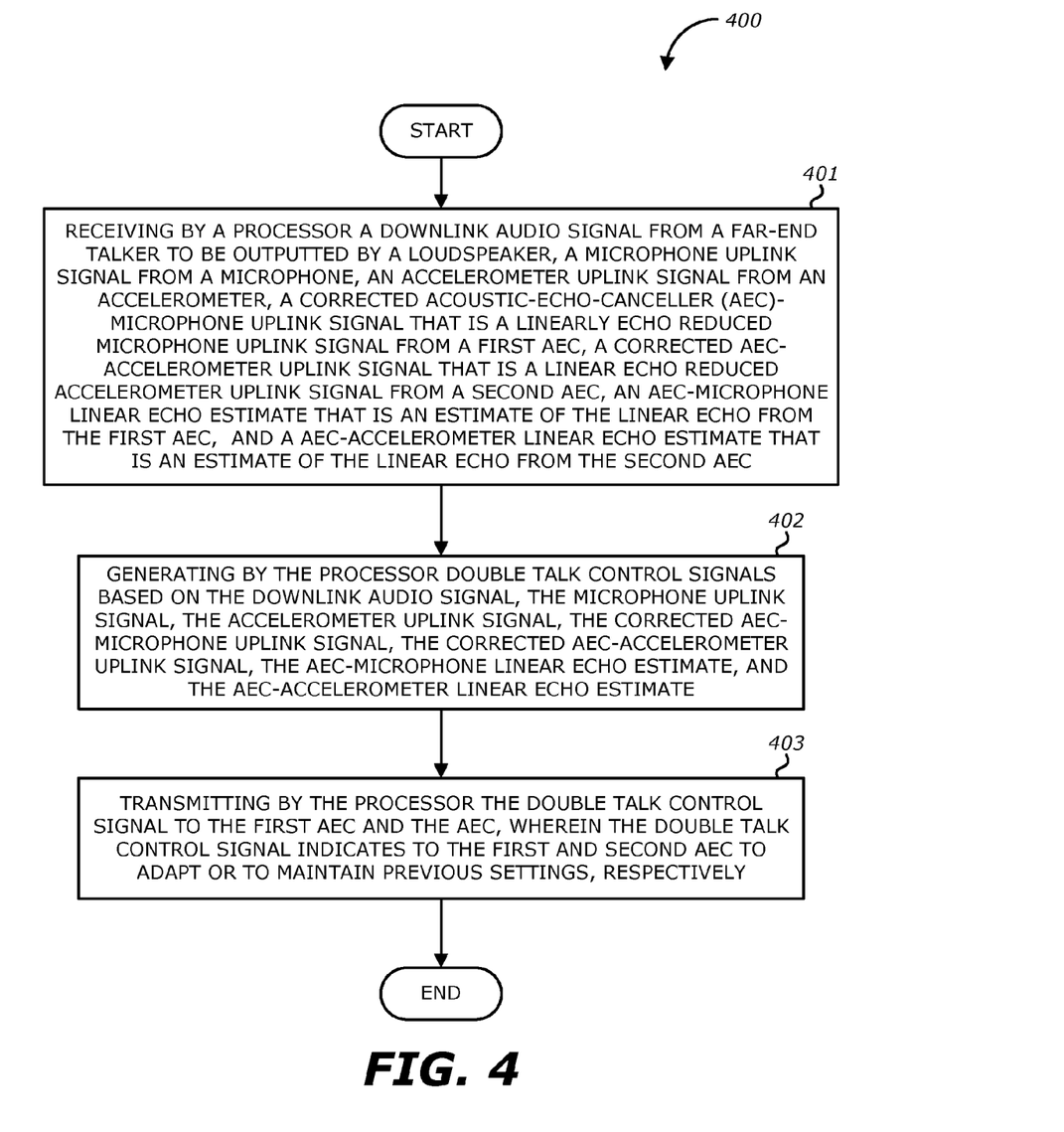
FIG. 4 illustrates a flow diagram of an example method of double talk detection and acoustic echo cancellation according to an embodiment of the invention.

FIG. 4 illustrates a flow diagram of an example method 400 for double talk detection with acoustic echo and noise control according to an embodiment of the invention. Method 400 starts with a processor of the double talk detector receiving a downlink audio signal from a far-end talker to be outputted by a loudspeaker, a microphone uplink signal from a microphone, an accelerometer uplink signal from an accelerometer, a linearly echo reduced microphone uplink signal from a first AEC ("a corrected AEC-mic uplink signal"), a linear echo reduced accelerometer uplink signal from a second AEC ("a corrected AEC-accelerometer uplink signal"), an estimate of the linear echo from the first AEC ("AEC-mic linear echo estimate"), and an estimate of the linear echo from the second AEC (AEC-accelerometer linear echo estimate"). At block 402, the processor current double-talk and noise-level control signals based on the downlink audio signal, the microphone uplink signal, the accelerometer uplink signal, the AEC-mic output signal, the AEC-accelerometer output signal, the AEC-mic linear echo estimate, the AEC-accelerometer linear echo estimate, noise-estimation levels, and past double-talk and noise-level control signals. At Block 403, the processor transmits the double talk control signal to the first AEC and the second AEC, wherein the double talk control signal indicates to the first and second AECs to converge or to maintain previous settings, respectively. In some embodiments, at Block 403, the processor transmits the double-talk as well as the noise-level control signal to the first and second AECs, and also to the signal corrector 160 including NSs, ESs, and signal blender(s). In some embodiments, the double-talk and noise-level control signal can be used to direct any of these modules to update parameters, or freeze parameters, or with what speed to update parameters, such as adaptive filters and echo and noise estimates.

In some embodiments of the invention, the double talk detector may identify five separate scenarios based on the downlink audio signal, the corrected AEC-microphone uplink signal, the corrected AEC-accelerometer uplink signal, the AEC-microphone linear echo estimate, and the AEC-accelerometer linear echo estimate. More specifically, as discussed above, the signals received by the double talk detector are generated based on transfer functions including: (i) the transfer function between downlink audio signal and microphone uplink signal, (ii) the transfer function between downlink audio signal and accelerometer uplink signal, (iii) the transfer function from the near-end speaker to the microphone uplink signal, (iv) the transfer function from the near-end speaker to the accelerometer uplink signal, (v) the transfer function from the ambient noise source to the microphone uplink signal, and (vi) the transfer function from the ambient noise source to the accelerometer uplink signal. The transfer function between downlink audio signal and microphone uplink signal includes the receiver transfer function, the microphone transfer function, and the acoustic transfer function between the loudspeaker to the microphone. The transfer function between downlink audio signal and accelerometer uplink signal includes the receiver transfer function, the accelerometer transfer function, and the acoustic transfer function between the loudspeaker to the accelerometer.

In this invention, the double talk detector uses these six transfer functions and the correlations between them are used to identify the separate scenarios and the double talk detector generates the double talk control signal accordingly.

function between downlink audio signal and microphone uplink signal and the transfer function between downlink audio signal and accelerometer uplink signal converge to a steady state filter. In the first scenario, the double talk detector may signal to the first AEC $150_1$ (AEC-microphone) to preserve the first AEC $150_1$'s converged state since the adaptation rate can be high in this first scenario. In this first scenario, the first AEC $150_1$'s convergence is appropriate to cancel far end echo (e.g., the far end user will not hear himself).

The second scenario differs from the first scenario in that there are path variations detected in the transfer functions while there are no near end signals detected (e.g., the mobile

TABLE 1

First and Second Scenarios

| Scenario | Near End Speech present? | Near End Noise present? | Double Talk present? | Transfer function between downlink audio signal & microphone uplink signal | Transfer function between downlink audio signal & accelerometer uplink signal | Double Talk Control Signal |
|---|---|---|---|---|---|---|
| 1. no path changes | No | No | No (far end speech only) | Converges to a steady state filter | Converges to a steady state filter | Signal to preserve the converged state of the AEC-mic; adaptation rate of the AEC-mic can be high |
| 2. with path changes | No | No | No (far end speech only) | Converges-changes and the AEC-mic track changes | Converges to a one state filter | Signal to preserve the converged state of the AEC-mic-adaptation rate of the AEC-mic can be high |

Referring to Table 1, the first and second scenarios are described. In both these scenarios, the double talk detector determines that the near end speech and the near end noise are not present based on an analysis of the received signals. Since no near end speech or noise is detected, there is no double talk detected in these scenarios. However, the first and the second scenarios differ in that the first scenario is one in which there are no path changes detected in the transfer function between downlink audio signal and microphone uplink signal and the transfer function between downlink audio signal and accelerometer uplink signal.

Accordingly, the first scenario is a scenario where there is echo cancellation with constant echo path. The double talk detector may establish this scenario when both the transfer device is moved). The double talk detector may establish this scenario when the transfer function between downlink audio signal and microphone uplink signal changes and the first AEC $150_1$ tracks the changes and converges while the transfer function between downlink audio signal and accelerometer uplink signal converges to a one state filter. In the second scenario, the path variations are being tracked cleanly and the first AEC $150_1$'s convergence is appropriate to cancel far end echo. In the second scenario, the double talk detector may signal to the first AEC $150_1$ to preserve the first AEC $150_1$'s converged state since the adaptation rate can be high in this second scenario.

TABLE 2

Third Scenario

| Scenario | Near End Speech present? | Near End Noise present? | Double Talk present? | Transfer function between downlink audio signal & microphone uplink signal | Transfer function between downlink audio signal & accelerometer uplink signal | Double Talk Control Signal |
|---|---|---|---|---|---|---|
| 3. | Yes | No | Yes | Is locked to the previous values and stop from divergence | Is locked to the previous values and stop from divergence | Signal to AEC-mic and AEC-accelerometer to lower adaptation rate or stop adaptation; use previous state |

Referring to Table 2, the third scenario is described to be a scenario in which double talk is detected, near end speech is present, and no near end noise is present. In this third scenario, the transfer function between downlink audio signal and microphone uplink signal and the transfer function between downlink audio signal and accelerometer uplink signal are locked to the previous values and stopped from divergence. The path variations and the near end signals are inseparable with the microphone uplink signal alone. If the first AEC 150$_1$ and the second AEC 150$_2$ (AEC-accelerometer) are left for adaptation, the AECs will diverge to a undesired state where the far-end echo is not cancelled and other echo artifacts are further introduced. In embodiments of the invention, this scenario is identified and isolated such that the double talk detector signals to the first and second AECs 150$_1$ and 150$_2$ to lower adaptation rate or stop adaptation. The double talk detector may also signal to the AECs 150$_1$ and 150$_2$ to maintain a previous adequate state.

TABLE 3

| | | | | | | |
|---|---|---|---|---|---|---|
| | | | | Fourth Scenario | | |
| Scenario | Near End Speech present? | Near End Noise present? | Double Talk present? | Transfer function between downlink audio signal & microphone uplink signal | Transfer function between downlink audio signal & accelerometer uplink signal | Double Talk Control Signal |
| 4. | No | Yes | Yes | Is adapted very slowly to counteract the noise increase | Is adapted very slowly to counteract the noise increase | Signal to AEC-mic and AEC-accelerometer to lower adaptation rate |

In the fourth scenario, described in Table 3, double talk is detected, near end speech is not present, and near end noise is present. The double talk detector may identify this scenario using the transfer function between the near-end noise signal and the accelerometer and the transfer function between the near-end noise signal and the microphone. Accordingly, the accelerometer uplink signal may be used to separate the third and fourth scenarios. The transfer function between downlink audio signal and microphone uplink signal and the transfer function between downlink audio signal and accelerometer uplink signal are adapted very slowly to counter act the noise increase. Accordingly, the double talk detector may signal to first AEC 150$_1$ and the second AEC 150$_2$ to lower adaptation rate to compensate for the background noise. In this scenario, a slower adaptation rate may be adequate but the AECs 150$_1$ and 150$_2$ may also show bias depending on the near-end noise present. In some embodiments, the double talk detector based on the noise level and the speech level may establish the adaptation rate.

TABLE 4

| | | | | | | |
|---|---|---|---|---|---|---|
| | | | | Fifth Scenario | | |
| Scenario | Near End Speech present? | Near End Noise present? | Double Talk present? | Transfer function between downlink audio signal & microphone uplink signal | Transfer function between downlink audio signal & accelerometer uplink signal | Double Talk Control Signal |
| 5. | Yes | Yes | Yes | Is locked to the previous values and stop from divergence | Is locked to the previous values and stop from divergence | Signal to AEC-mic and AEC-accelerometer to lower adaptation rate; use previous state |

Referring to Table 4, the fifth scenario is a scenario where double talk is detected, near end speech is not present, and near end noise is present. In this scenario, the path variations and near end signals are inseparable such that if the first and second AECs $150_1$ and $150_2$ are left for adaptation, the AECs $150_1$ and $150_2$ may diverge to an undesired state where the far-end echo will not be cancelled and further artifacts will be introduced into the uplink signal. In the fifth scenario, the transfer function between downlink audio signal and microphone uplink signal as well as the transfer function between downlink audio signal and accelerometer uplink signal are locked to the previous values and stopped from divergence. In this fifth scenario, the double talk detector may signal to the first and second AECs $150_1$ and $150_2$ to lower adaptation rate or stop adaptation. The double talk detector may also signal to the AECs $150_1$ and $150_2$ to maintain a previous adequate state.

The variance of the transfer function between downlink audio signal and accelerometer uplink signal is smaller than the variance between the transfer function between downlink audio signal and microphone uplink signal. Accordingly, in some embodiments, the double talk detector uses the difference in variance to isolate path variations to further support the identification of the scenarios. Further, in some embodiments, the double talk detector may analyze the received signals on a per bin basis to generate double talk control signals.

A general description of suitable electronic devices for performing these functions is provided below with respect to FIG. 5, which is a block diagram depicting various components that may be present in electronic devices suitable for use with the present techniques. These types of electronic devices, as well as other electronic devices providing comparable voice communications capabilities (e.g., VoIP, telephone communications, etc.), may be used in conjunction with the present techniques.

Figure 5:
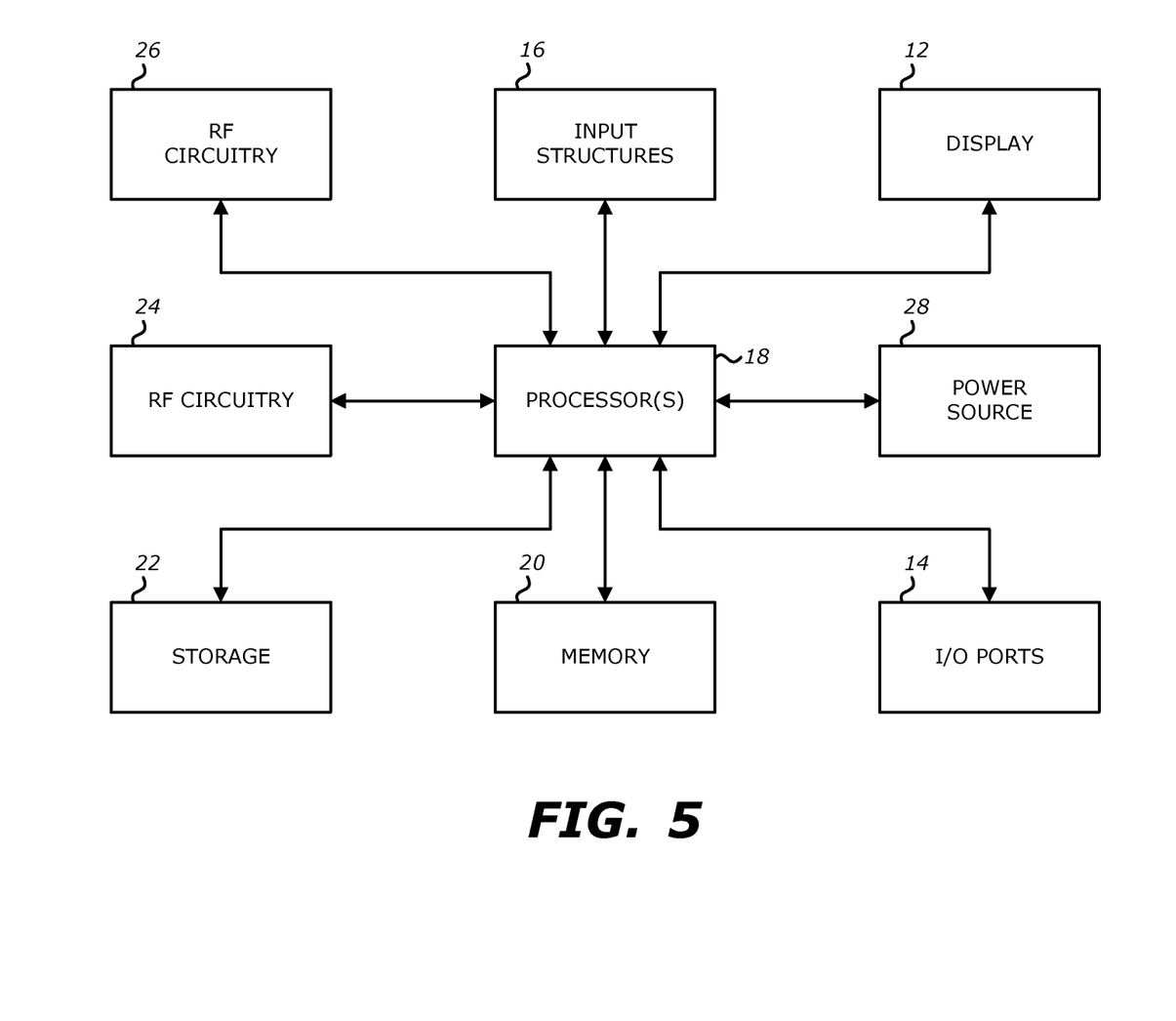
FIG. 5 is a block diagram of exemplary components of an electronic device detecting a user's voice activity in accordance with aspects of the present disclosure.

Keeping the above points in mind, FIG. 5 is a block diagram illustrating components that may be present in one such electronic device 10, and which may allow the device 10 to function in accordance with the techniques discussed herein. The various functional blocks shown in FIG. 5 may include hardware elements (including circuitry), software elements (including computer code stored on a computer-readable medium, such as a hard drive or system memory), or a combination of both hardware and software elements. It should be noted that FIG. 5 is merely one example of a particular implementation and is merely intended to illustrate the types of components that may be present in the electronic device 10. For example, in the illustrated embodiment, these components may include a display 12, input/output (I/O) ports 14, input structures 16, one or more processors 18, memory device(s) 20, non-volatile storage 22, expansion card(s) 24, RF circuitry 26, and power source 28. Examples of the electronic device 10 may include computers that are generally portable (such as laptop, notebook, tablet, and handheld computers), as well as computers that are generally used in one place (such as conventional desktop computers, workstations, and servers). The computer includes a housing or enclosure, the display 12 (e.g., as an LCD or some other suitable display), I/O ports 14, and input structures 16.

The electronic device 10 may also take the form of other types of devices, such as mobile telephones, media players, personal data organizers, handheld game platforms, cameras, and/or combinations of such devices. For instance, the device 10 may be provided in the form of a handheld electronic device that includes various functionalities (such as the ability to take pictures, make telephone calls, access the Internet, communicate via email, record audio and/or video, listen to music, play games, connect to wireless networks, and so forth).

In another embodiment, the electronic device 10 may also be provided in the form of a portable multi-function tablet computing device. In certain embodiments, the tablet computing device may provide the functionality of media player, a web browser, a cellular phone, a gaming platform, a personal data organizer, and so forth.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system for double talk detection with acoustic echo and noise control comprising:
   a loudspeaker to output a loudspeaker signal including a downlink audio signal from a far end speaker;
   a microphone to receive at least one of: a near-end speaker signal, ambient noise signal, and the loudspeaker signal, and to generate a microphone uplink signal;
   an accelerometer to receive at least one of: the near-end speaker signal, ambient noise signal, and the loudspeaker signal, and to generate an accelerometer uplink signal;
   first acoustic-echo-canceller (AEC) to receive the downlink audio signal, the microphone uplink signal, and a double-talk control signal, and to generate a corrected AEC-microphone uplink signal and an AEC-microphone linear echo estimate;
   second AEC to receive the downlink audio signal, the accelerometer uplink signal, and the double-talk control signal, and to generate a corrected AEC-accelerometer uplink signal and an AEC-accelerometer linear echo estimate; and
   a double talk detector to receive the downlink audio signal, the microphone uplink signal, the accelerometer uplink signal, the corrected AEC-microphone uplink signal, the corrected AEC-accelerometer uplink signal, the AEC-microphone linear echo estimate, and the AEC-accelerometer linear echo estimate, and to generate the double talk control signal based on the downlink audio signal, the microphone uplink signal, the accelerometer uplink signal, the corrected AEC-microphone uplink signal, the corrected AEC-accelerometer uplink signal, the AEC-microphone linear echo estimate, and the AEC-accelerometer linear echo estimate, wherein
   the double talk control signal indicates to the first and second AEC to adapt or to maintain previous settings, respectively; and
   a signal corrector to generate an uplink audio signal that includes at least one of: the corrected AEC-microphone uplink signal and the corrected AEC-accelerometer uplink signal.

2. The system of claim 1, wherein the first AEC generates the corrected AEC-microphone uplink signal by removing loudspeaker echo in the microphone uplink signal using the AEC-microphone linear echo estimate, and the second AEC generates the corrected AEC-accelerometer uplink signal by removing the loud speaker echo in the accelerometer uplink signal using the AEC-accelerometer linear echo estimate.

3. The system of claim 1, wherein the signal corrector receives the double talk control signal and generates the uplink audio signal based on the double talk control signal.

4. The system of claim 1, wherein the double talk control signal indicates presence of a double-talk situation.

5. The system of claim 1, wherein the double talk detector further comprises:
   a processor to generate the double talk control signal based on correlation measures in the spectral domain.

6. The system of claim 5, wherein the double talk detector further comprises: a Gaussian Mixture Model (GMM) based classifier to determine when the double talk scenario is present or absent.

7. A system for double talk detection with acoustic echo and noise control comprising:
   a loudspeaker to output a loudspeaker signal including a downlink audio signal from a far end speaker;
   a microphone to receive at least one of: a near-end speaker signal, ambient noise signal, and the loudspeaker signal, and to generate a microphone uplink signal;
   an accelerometer to receive at least one of: the near-end speaker signal, ambient noise signal, and the loudspeaker signal, and to generate an accelerometer uplink signal;
   first acoustic-echo-canceller (AEC) to receive the downlink audio signal, the microphone uplink signal, and a double-talk control signal, and to generate a corrected AEC-microphone uplink signal and an AEC-microphone linear echo estimate;
   second AEC to receive the downlink audio signal, the accelerometer uplink signal, and the double-talk control signal, and to generate a corrected AEC-accelerometer uplink signal and an AEC-accelerometer linear echo estimate; and
   a first double talk detector
      to receive the downlink audio signal, the microphone uplink signal, the corrected AEC-microphone uplink signal, and the AEC-microphone linear echo estimate, and
      to generate a first double talk control signal based on the downlink audio signal, the microphone uplink signal, the corrected AEC-microphone uplink signal, and the AEC-microphone linear echo estimate; and
   a second double talk detector
      to receive the downlink audio signal, the accelerometer uplink signal, the corrected AEC-accelerometer uplink signal, and the AEC-accelerometer linear echo estimate, and
      to generate a second double talk control signal based on the downlink audio signal, the accelerometer uplink signal, the corrected AEC-accelerometer uplink signal, and the AEC-accelerometer linear echo estimate,
   a third double talk detector to receive the first and the second double talk control signals and generate a third double talk control signal that indicates to the first and second AEC to adapt or to maintain previous settings, respectively; and
   a signal corrector to generate an uplink audio signal that includes at least one of: the corrected AEC-microphone uplink signal and the corrected ACE-accelerometer uplink signal.

8. The system of claim 7, wherein the signal corrector receives the third double talk control signal and generates the uplink audio signal based on the third double talk control signal.

9. The system of claim 7, wherein the third double talk control signal indicates presence of a double-talk situation.

10. The system of claim 7, wherein the first and second double talk detectors, respectively, further comprise: a processor to generate the first and second double talk control signals based on correlation measures in the spectral domain.

11. The system of claim 10, wherein the first and second double talk detectors, respectively, further comprise: a Gaussian Mixture Model (GMM) based classifier to determine when the double talk scenario is present or absent.

12. A method of double talk detection and acoustic echo cancellation comprising:
   receiving by a processor a downlink audio signal from a far-end talker to be outputted by a loudspeaker, a microphone uplink signal from a microphone, an accelerometer uplink signal from an accelerometer, a corrected acoustic-echo-canceller (AEC)-microphone uplink signal that is a linearly echo reduced microphone uplink signal from a first AEC, a corrected AEC-accelerometer uplink signal that is a linear echo reduced accelerometer uplink signal from a second AEC, an AEC-microphone linear echo estimate that is an estimate of the linear echo from the first AEC, and a AEC-accelerometer linear echo estimate that is an estimate of the linear echo from the second AEC;
   generating by the processor a double talk control signal based on the downlink audio signal, the microphone uplink signal, the accelerometer uplink signal, the corrected AEC-microphone uplink signal, the corrected AEC-accelerometer uplink signal, the AEC-microphone linear echo estimate, and the AEC-accelerometer linear echo estimate; and
   transmitting by the processor the double talk control signal to the first AEC and the second AEC, wherein the double talk control signal indicates to the first and second AEC to adapt or to maintain previous settings, respectively.

13. The method of claim 12, further comprising:
   transmitting by the processor the double talk control signal to a signal corrector to generate an uplink audio signal based on the double talk control signal.

14. The method of claim 13, wherein the uplink audio signal includes at least one of: the corrected AEC-microphone uplink signal and the corrected AEC-accelerometer uplink signal.

15. The method of claim 13, further comprising:
   generating by the processor a noise level control signal based on the downlink audio signal, the microphone uplink signal, the accelerometer uplink signal, the corrected AEC-microphone uplink signal, the corrected AEC-accelerometer uplink signal, the AEC-microphone linear echo estimate, and the AEC-accelerometer linear echo estimate; and
   transmitting by the processor the noise level control signal to the first AEC, the second AEC, and the signal corrector.

16. The method of claim 15, wherein the double talk control signal and the noise level control signal indicate to the first and second AEC, and the signal corrector to adapt or to maintain previous settings, respectively.

17. The method of claim 16, wherein the double talk control signal and the noise level control signal indicate to the first and second AEC, and the signal corrector to update parameters, freeze parameters or a speed at which to update parameters.

18. The method of claim 12, wherein the corrected AEC-microphone uplink signal is generated by the first AEC by removing loudspeaker echo in the microphone uplink signal using the AEC-microphone linear echo estimate, and the corrected AEC-accelerometer uplink signal is generated by the second AEC by removing loud speaker echo in the accelerometer signal using the AEC-accelerometer linear echo estimate.

19. The method of claim 12, wherein the double talk control signal indicates presence of a double-talk situation or a noise level.

20. The method of claim 12, wherein the double talk control signal is generated based on correlation measures in the spectral domain.

21. The method of claim 12, wherein the double talk control signal is generated using a Gaussian Mixture Model (GMM) based classifier to determine when the double talk scenario is present or absent.

* * * * *